(No Model.)  2 Sheets—Sheet 2.
S. HARRIS.
BRAKE.
No. 419,015.  Patented Jan. 7, 1890.
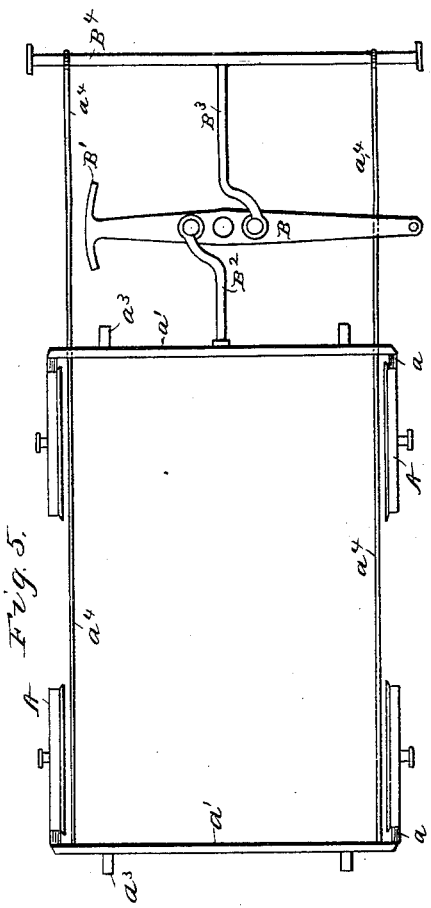
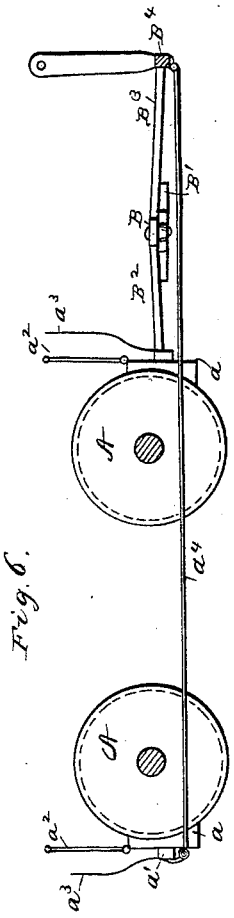
WITNESSES
Belle S. Lourie
W. R. Edden
INVENTOR
Samuel Harris
By Leggett & Leggett
ATTORNEYS

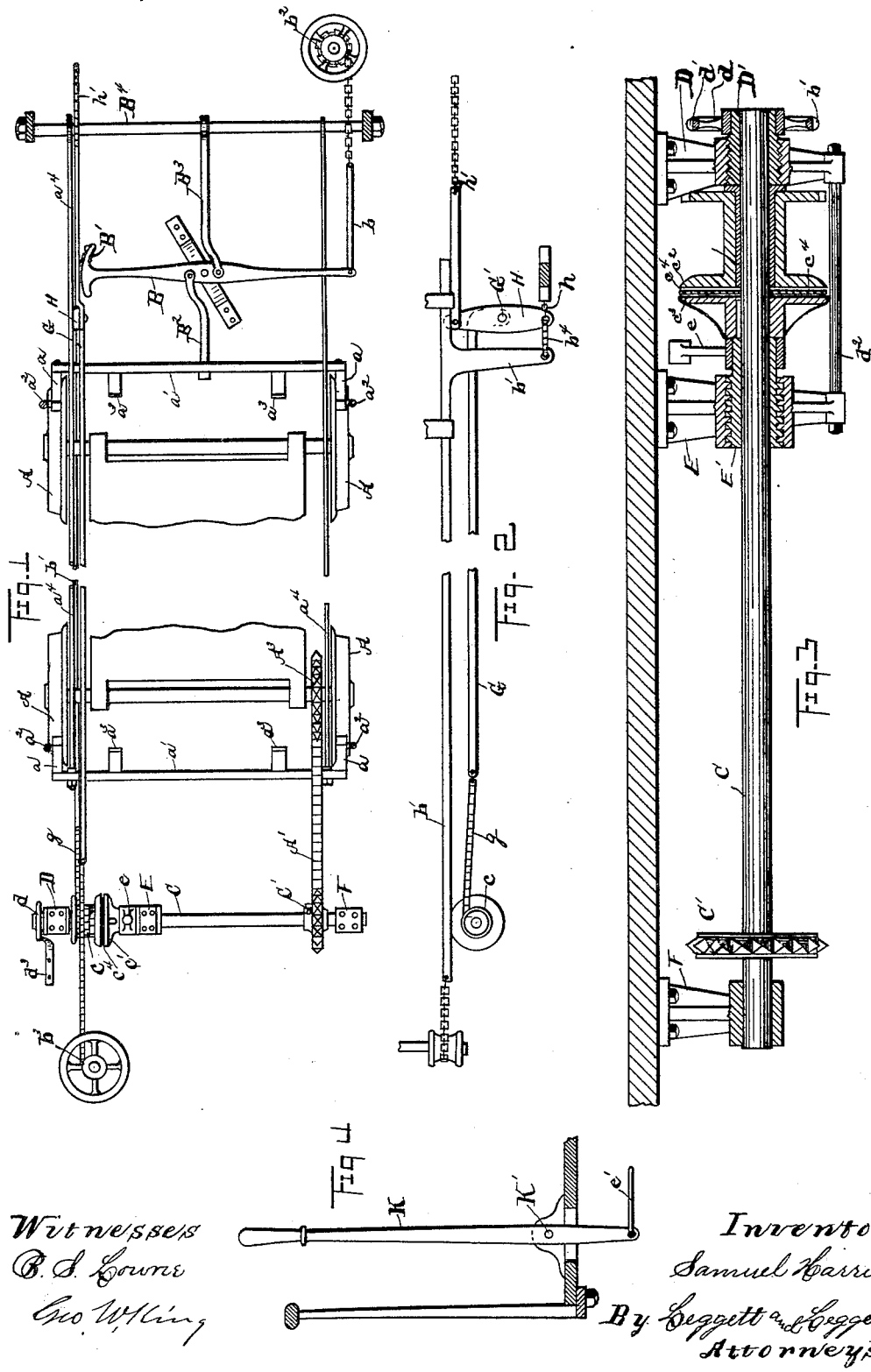

UNITED STATES PATENT OFFICE.

SAMUEL HARRIS, OF CLEVELAND, OHIO, ASSIGNOR TO TOM L. JOHNSON, OF SAME PLACE.

BRAKE.

SPECIFICATION forming part of Letters Patent No. 419,015, dated January 7, 1890.

Application filed July 29, 1889. Serial No. 319,003. (No model.)

*To all whom it may concern:*

Be it known that I, SAMUEL HARRIS, of Cleveland, in the county of Cuyahoga and State of Ohio, have invented certain new and useful Improvements in Brake Mechanism; and I do hereby declare the following to be a full, clear, and exact description of the invention, such as will enable others skilled in the art to which it pertains to make and use the same.

My invention relates to improvements in brake mechanism designed for motor-cars on street-railways, in which, in addition to the ordinary brake mechanism and devices heretofore employed for applying the brakes by hand, mechanism is provided for setting the brakes by the momentum of the car; also, is provided an equalizing-lever and connecting devices, by means of which the brakes of the motor-car and the brakes of a car being towed by the motor may be simultaneously operated and with equal force.

My invention also relates to the details of construction hereinafter described, and pointed out in the claims.

In the accompanying drawings, Figure 1 is a plan view with the body of the car removed, portions being broken away to reduce the size of the drawings. Fig. 2 is a view in side elevation of the connecting-rods and equalizing-lever hereinafter described. Fig. 3 is an enlarged side elevation of shaft C and attachments, the same being an end view relative to the car. Fig. 4 is a detail of hand-lever and attachment. Figs. 5 and 6 are diagrammatic plan and side elevation in detail of the brake-bars and connecting mechanism for operating the same.

The brakes proper and the means for operating the brake by hand from either end of the car may be substantially as heretofore used, and, in brief, is as follows:

A A represent the car-wheels, and $a$ $a$ brake blocks or shoes, the latter in pairs being attached to bar $a'$, the brake-shoes being suspended by means of links $a^2$ from the body of the car, and bars $a'$ having attached spring $a^3$ for holding the brake-shoes away from the car-wheels while power is not being applied.

B is a lateral lever fulcrumed at the center thereof and pivotally connected therewith. On opposite sides of the fulcrum are push-bars $B^2$ and $B^3$, the former connecting with the rearward bar $a'$ aforesaid and the latter connecting with bar $B^4$, the latter in turn being connected by rod $a^4$ with the forward brake-bar $a'$, bar $B^4$ being suspended by links from the body of the car. Rods $b$ and $b'$ lead in opposite directions from the respective ends of lever B. These rods terminate in chains that connect with drums $b^2$ and $b^3$, by means of which the brakes can be applied by hand from either end of the car.

My improved mechanism for applying this brake mechanism by means of the momentum of the car is as follows:

C is a shaft extending crosswise of the car and supported by hangers D, E, and F, depending from the body of the car. This shaft is provided with a sprocket-wheel C', the latter being connected by endless chain A' with sprocket-wheel $A^2$, mounted on one of the car-axles. Shaft C therefore runs continuously while the car is traveling. Shaft C, between hangers D and E, has mounted thereon a drum $c$ and hub $c'$. The former is mounted loose on the shaft, and is adapted to wind chain $g$ thereon. Hub $c'$ is connected with the shaft by means of the well-known device of groove and spline, so that the hub revolves with the shaft, but may slide endwise thereon. The drum and hub have, respectively, flanges $c^2$ $c^3$, opposing each other, this part of the device constituting a friction-clutch, and usually there is a leather disk $c^4$ inserted between the friction-flanges for receiving the wear and to give a better friction-surface. Hanger F is of ordinary construction, having a journal-box for supporting the one end of shaft C. The heads of hangers D and E are screw-threaded internally for engaging the external screw-threads of sleeves D' and E', these sleeves serving as journal-boxes for the shaft. The outer end of sleeve D' is provided with a hand-wheel $d$ for turning the sleeve on its axis to adjust the sleeve lengthwise of the shaft, the inner end of this sleeve abutting the outer end of drum $c$ aforesaid. The inner end of sleeve E' abuts the outer end of hub $c'$ aforesaid, this sleeve having attached an arm $e$, extending radially, by means of which sleeve E' may be turned on its axis a limited distance. Arm $e$ is connected by links $e'$ with hand-lever K, the latter being fulcrumed at K' to a housing connected with the car-platform, the free end or handle of the lever being within reach of the operator. By moving this hand-lever forward and back sleeve E' is oscillated, and by means of the screw-threaded bearing of this sleeve the latter, in turning in the one direction, is forced against hub c', and in turning the sleeve in the opposite direction the sleeve is backed away from the hub. Sleeve D' is adjusted from time to time to take up the wear of the parts and to leave suitable clearance between the friction-disks when hub E' is backed off. The lower ends of hangers D and E are connected by tie-rod $d^2$. By drawing on hand-lever K sleeve E' is turned on its axis in the direction to force hub c' toward drum c, thus causing flanges $c^2 c^3$ to engage the intermediate disk $c^4$ with sufficient force to cause the drum to rotate, and thus wind chain g thereon. By reversing lever K the recoil of the aforesaid springs $a^3$ on the brake-bars unwinds chain g, and in so doing of course reverses the drum. Hand-wheel d is provided with a series of notches d' on the periphery, and a dog $d^3$ is provided for engaging the respective notches to hold the hand-wheel and connected sleeve in their adjusted position. Chain g connects with sliding bar G, the free end of the latter at G' being pivoted to equalizing-lever H at the longitudinal center of the latter. This equalizing lever or bar at the extremes thereof has attached chains h and h', both leading rearward, and the former connecting with bar B aforesaid. Chain h' connects with the chain of the next car for operating a similar brake mechanism thereon. With such construction it is evident that the draft on chains h h' will be equal and that equal power will be applied to the two brake mechanisms of the two cars. When there is no second or rearward car, chain h' is fastened to a hook (not shown) connected with the body of the car, in which case the brakes on the motor-car will be operated with the same power as when the brakes of the two cars are being operated. To prevent chains h from drawing more or less in a lateral direction on bar G by reason of the vibrations of lever B, the latter is provided with a sector B', to the face of which chain h is attached, so that the draft of this chain is always in line with lever G. A few links of chain $b^4$ connect rod or bar b with the end of chain h, so that either the hand device or the power device will operate the sector of lever B in setting the brake.

The ordinary appliances for setting the brakes by hand operate fairly well where only one car is being stopped. With two or more cars such hand mechanism is inadequate, and if sufficient power could be applied the brakes operating on one car traveling on a slippery track would not be sufficient to stop two or more cars within the desired distance.

With my improved mechanism two cars are stopped as soon as one car, and the labor of the operator in braking the cars is much reduced as compared with the old devices for setting the brakes on one car by hand. The power applied to the drum in setting the brakes by the momentum of the car reacts on the connected car-axle and helps to check the movement of the car, so that if the brakes were only applied with the same power as with the hand mechanism the car would stop sooner.

In case of any disarrangement of the devices for braking by power, the hand mechanism can be resorted to, and my improved devices can readily be attached to cars already in use.

What I claim is—

1. In brake mechanism for street-cars, the combination, with rotating shaft propelled by the movement of the car, and drum mounted on the shaft and operated by friction-clutch, such drum being adapted to wind the chain in setting the brakes, of screw-threaded sleeve embracing the shaft and engaging screw-threaded hanger, and suitable connecting mechanism for rotating the sleeve in operating the friction-clutch, substantially as set forth.

2. In brake mechanism for street-cars, in combination, shaft operatively connected with car-axle, drum mounted on such shaft and operated by friction-clutch, a screw-threaded sleeve constituting a journal-bearing for the shaft, such sleeve abutting one member of the clutch and engaging a screw-threaded hanger, and connecting mechanism for rotating the sleeve by hand in operating the friction-clutch, substantially as set forth.

3. In brake mechanism for street-cars, in combination, rotating shaft propelled by the movement of the car, and drum mounted on the shaft and operated by friction-clutch, the two members of the clutch being embraced by screw-threaded sleeves, the latter engaging, respectively, stationary screw-threaded bearings, whereby the members of the friction-clutch are brought in contact by rotating one or both of the sleeves, substantially as set forth.

4. In brake mechanism for street-cars, in combination, rotating shaft having a drum mounted thereon, such drum being operated by friction-clutch, screw-threaded sleeve engaging a screw-threaded bearing, such sleeve abutting the one member of the clutch, whereby the clutch is operated by rotating the sleeve, and a screw-threaded sleeve engaging a screw-threaded bearing and abutting the other member of the clutch, whereby the clutch is adjusted by rotating the latter sleeve, substantially as set forth.

5. In brake mechanism for street-cars, the combination, with a shaft operatively connected with the car-axle, a drum mounted on such shaft, and friction-clutch for locking the drum to the shaft, of an equalizing-lever actuated by the drum, mechanism connecting the said lever and two sets of brake mechanism, and hand-wheels and connections for actuating one of said sets of brake mechanism, substantially as set forth.

6. In brake mechanism for street-cars, the combination, with a shaft operatively connected with the car-axle, a drum mounted on such shaft, and friction-clutch for locking the drum to the shaft, of an equalizing-lever, mechanism attached to the longitudinal center of said lever and leading to the drum, and two sets of brake mechanism connected to said lever, whereby they are simultaneously operated and the power distributed equally to the different brake mechanisms, substantially as set forth.

7. In a brake mechanism, the combination, with a lever pivoted at a point between its ends, of brake-actuating devices connected to said lever on opposite sides of its pivotal bearing, and a sector to which the actuating device is attached, the said sector being located at or near one end of the lever, substantially as set forth.

In testimony whereof I sign this specification, in the presence of two witnesses, this 24th day of June, 1889.

SAMUEL HARRIS.

Witnesses:
   THOS. H. DORER,
   ALBERT E. LYNCH.